US010202052B2

(12) United States Patent
Nakamura et al.

(10) Patent No.: US 10,202,052 B2
(45) Date of Patent: Feb. 12, 2019

(54) SEAT CUSHION ADJUSTER, SEAT, AND ADJUSTMENT METHOD OF SEAT

(71) Applicant: TOYOTA BOSHOKU KABUSHIKI KAISHA, Aichi (JP)

(72) Inventors: Masaharu Nakamura, Aichi (JP); Jueru Shimizu, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 15/596,086

(22) Filed: May 16, 2017

(65) Prior Publication Data

US 2017/0334318 A1 Nov. 23, 2017

(30) Foreign Application Priority Data

May 20, 2016 (JP) .................. 2016-101589

(51) Int. Cl.
*B60N 2/02* (2006.01)
*B60N 2/18* (2006.01)
*B60N 2/07* (2006.01)
*B60N 2/68* (2006.01)

(52) U.S. Cl.
CPC ......... *B60N 2/0732* (2013.01); *B60N 2/0284* (2013.01); *B60N 2/682* (2013.01); *B60N 2002/024* (2013.01)

(58) Field of Classification Search
CPC .... B60N 2/0732; B60N 2/0284; B60N 2/682; B60N 2002/024
USPC ........................................ 297/344.11, 184.11
See application file for complete search history.

(56) References Cited

U.S. PATENT DOCUMENTS

| | | | | |
|---|---|---|---|---|
| 3,013,849 A | * | 12/1961 | Tanner | A47B 1/10 384/18 |
| 6,676,099 B2 | * | 1/2004 | Mallard | B60N 2/015 248/429 |
| 6,908,149 B1 | * | 6/2005 | Yamaguchi | B60N 2/4221 297/284.11 X |
| 7,104,601 B2 | * | 9/2006 | Masuda | B60N 2/42763 297/284.11 X |
| 7,108,322 B2 | * | 9/2006 | Erker | B60N 2/995 297/284.11 |
| 7,422,186 B2 | * | 9/2008 | Kropfreiter | B60N 2/067 248/424 |
| 7,614,693 B2 | * | 11/2009 | Ito | B60N 2/0284 297/284.11 |
| 7,669,929 B2 | * | 3/2010 | Simon | B60N 2/0224 297/284.11 |

(Continued)

FOREIGN PATENT DOCUMENTS

JP 2011-15867 1/2011

*Primary Examiner* — Rodney B White
(74) *Attorney, Agent, or Firm* — Greenblum & Bernstein, P.L.C.

(57) ABSTRACT

A seat cushion adjuster in one aspect of the present disclosure comprises at least one bracket, at least one slider, and a plurality of interposing members. The plurality of interposing members is disposed between an inner wall of the at least one bracket and the at least one slider so as to interpose the at least one slider among the plurality of interposing members in an inner hollow portion of the at least one bracket. At least one interposing member of the plurality of interposing members comprises at least one supporting protrusion portion protruding toward the at least one bracket.

13 Claims, 9 Drawing Sheets

(56) References Cited

U.S. PATENT DOCUMENTS

| | | | | |
|---|---|---|---|---|
| 7,814,637 B2* | 10/2010 | Terada | B60N 2/0224 | 174/113 R |
| 7,874,621 B2* | 1/2011 | Gumbrich | B60N 2/0284 | 297/284.11 |
| 7,997,648 B2* | 8/2011 | Becker | B60N 2/0284 | 297/284.11 |
| 8,016,355 B2* | 9/2011 | Ito | B60N 2/62 | 297/284.11 |
| 8,128,167 B2* | 3/2012 | Zhong | B60N 2/62 | 297/284.11 |
| 8,167,370 B2 | 5/2012 | Arakawa et al. | | |
| 8,469,328 B2* | 6/2013 | Nakamura | B60N 2/0705 | 248/424 |
| 8,474,777 B2* | 7/2013 | Nihonmatsu | B60N 2/0705 | 248/424 |
| 8,579,373 B2* | 11/2013 | Pradier | B60N 2/0232 | 297/284.11 |
| 8,925,889 B2* | 1/2015 | Nagura | B60N 2/0705 | 248/424 |
| 9,016,785 B2* | 4/2015 | Freisleben | B60N 2/0232 | 297/284.11 |
| 2002/0070594 A1* | 6/2002 | Mochizuki | B60N 2/02 | 297/344.1 |
| 2007/0108817 A1* | 5/2007 | Lee | B60N 2/62 | 297/284.11 |
| 2008/0157577 A1* | 7/2008 | Lindsay | B60N 2/0224 | 297/284.11 |
| 2009/0085387 A1* | 4/2009 | Thiel | B60N 2/0284 | 297/284.11 |
| 2010/0090083 A1* | 4/2010 | Kojima | B60N 2/0725 | 248/429 |
| 2011/0006573 A1* | 1/2011 | Arakawa | B60N 2/0232 | 297/284.11 |
| 2012/0256074 A1* | 10/2012 | Garotte | B60N 2/073 | 248/429 |
| 2015/0090853 A1* | 4/2015 | Arakawa | B60N 2/0705 | 248/429 |
| 2015/0090854 A1* | 4/2015 | Hayashi | B60N 2/0705 | 248/429 |
| 2015/0090855 A1* | 4/2015 | Arakawa | B60N 2/07 | 248/429 |
| 2015/0258914 A1* | 9/2015 | Lee | B60N 2/0284 | 297/284.11 |
| 2016/0137104 A1* | 5/2016 | Bortolon | B60N 2/62 | 297/284.11 |

* cited by examiner

SEAT CUSHION ADJUSTER, SEAT, AND ADJUSTMENT METHOD OF SEAT

CROSS-REFERENCE TO RELATED APPLICATIONS

The present application claims the benefit of Japanese Patent Application No. 2016-101589 filed on May 20, 2016 with the Japan Patent Office, and the entire disclosure of which is incorporated herein by reference.

BACKGROUND

The present disclosure relates to adjustment of a seat cushion.

Japanese Unexamined Patent Application Publication No. 2011-015867 discloses a seat for a vehicle, which comprises a cushion body part, a cushion adjustable part, and an adjustment mechanism serving as a seat cushion adjuster.

The cushion body part includes a seating surface of the seat. The cushion adjustable part is configured to change its position with respect to the cushion body part. The adjustment mechanism is configured such that sliding of a rod causes the cushion adjustable part to change its position, thereby changing a size of the seating surface of the seat cushion.

SUMMARY

On a section of the seat cushion extended by the seat cushion adjuster, that is, on the cushion adjustable part, a human body is to be seated. For this purpose, the seat cushion adjuster needs to function as a seat frame that supports the cushion adjustable part; thus, rigidity of the seat cushion adjuster needs to be enhanced.

However, in the aforementioned seat cushion adjuster with enhanced rigidity, a larger load may be required to drive the cushion adjustable part.

Accordingly, it is desirable in one aspect of the present disclosure to reduce a load required to drive the cushion adjustable part, while ensuring rigidity of the seat cushion adjuster.

A seat cushion adjuster in one aspect of the present disclosure comprises at least one bracket, at least one slider, and a plurality of interposing members.

The at least one bracket is configured to be secured to a first one of a cushion body part and a cushion adjustable part. The cushion body part comprises a first seating surface. The cushion adjustable part comprises a second seating surface and is arranged in an arrangement direction pre-specified with respect to the cushion body part and is capable of changing a position thereof with respect to the cushion body part. The at least one bracket comprises an inner wall configured to provide an inner hollow portion extending in the arrangement direction. The at least one slider is configured to be secured to a second one of the cushion body part and the cushion adjustable part, and the second one is different from the first one. The at least one slider is inserted into the inner hollow portion of the at least one bracket.

The plurality of interposing members is disposed between the inner wall of the at least one bracket and the at least one slider so as to interpose the at least one slider among the plurality of interposing members in the inner hollow portion of the at least one bracket. At least one interposing member of the plurality of interposing members comprises at least one supporting protrusion portion protruding toward the at least one bracket.

In the seat cushion adjuster as described above, the at least one slider is caused to slide by an external force that has been applied thereto, thereby changing a position of the cushion adjustable part.

In the seat cushion adjuster, the at least one slider is inserted in the at least one bracket in a state where the at least one slider is disposed among the plurality of interposing members. Thus, rigidity for supporting the cushion adjustable part can be ensured.

Moreover, in the seat cushion adjuster, the at least one slider is caused to slide by the external force, which causing a load to be applied to the plurality of interposing members. When the load is applied to the plurality of interposing members, the at least one interposing member of the plurality of interposing members is allowed to bend corresponding to a height of the at least one supporting protrusion portion.

When the at least one interposing member is bent, it is possible to reduce a contact area between the at least one interposing member and the at least one slider and therefore, reduce a contact load, thereby reducing a load necessary for driving the at least one slider.

Accordingly, according to the above-described seat cushion adjuster, it is possible to reduce a load for driving the at least one slider, while ensuring the rigidity.

The at least one supporting protrusion portion may comprise a plurality of supporting protrusion portions spaced apart from one another along an insertion direction of the at least one slider into the inner hollow portion.

In the seat cushion adjuster configured as described above, when a load generated due to the sliding of the at least one slider is applied to the at least one interposing member, this at least one interposing member is allowed to bend sufficiently.

At least one interposing member of the plurality of interposing members may comprise at least one sliding projection protruding toward the at least one slider.

With such a seat cushion adjuster, the at least one interposing member and the at least one slider are in contact with each other via the at least one sliding projection. Accordingly, the contact area between the at least one interposing member and the at least one slider can be reduced, thereby enabling the at least one slider to slide smoothly.

The plurality of interposing members may comprise a first interposing member and a second interposing member. The second interposing member may be disposed to face the first interposing member with the at least one slider disposed therebetween.

The at least one supporting protrusion portion may comprise: at least two first supporting protrusion portions provided in a first member of the first interposing member and the second interposing member; and at least one second supporting protrusion portion provided in a second member of the first interposing member and the second interposing member; the second member is different from the first member.

The at least one second supporting protrusion portion may be disposed between the at least two first supporting protrusion portions in the insertion direction.

According to the seat cushion adjuster configured as described above, the first interposing member and the second interposing member are allowed to bend sufficiently by a load generated due to the sliding of the at least one slider.

In addition, with the seat cushion adjuster, it is possible to firmly support the at least one slider inside the at least one bracket.

The at least one slider may comprise a base plate part and a pair of raised parts; the base plate part comprises a pair of ends that extends in the arrangement direction and that faces each other; the pair of raised parts is raised from the pair of ends of the base plate part so as to be raised with respect to one surface of the base plate part. The base plate part and the pair of raised parts provide a concave portion. That is, the at least one, slider may have a U-shaped cross section.

The first interposing member may comprise a convex disposed inside the concave portion. The second interposing member may comprise a concave accommodating the at least one slider therein. The second interposing member may be disposed to face the first interposing member with the at least one slider disposed between the first interposing member and the second interposing member.

With the seat cushion adjuster configured as described above, rigidity in a height direction of the seat can be ensured. Moreover, with this seat cushion adjuster, a length of the at least one slider in a width direction can be reduced and therefore, a size of the seat cushion adjuster in the width direction can be reduced.

In other words, it is possible to provide a seat cushion adjuster which has ensured rigidity and a size of which is reduced.

The at least one bracket may have a tubular shape. The at least one bracket may comprise a plurality of brackets. The at least one slider may comprise a plurality of sliders.

Another aspect of the present disclosure is a seat that comprises the cushion body part, the cushion adjustable part, the at least one bracket, the at least one slider, and the plurality of interposing members.

Because this seat comprises the above-described seat cushion adjuster, the same effects as those obtained by the above-described seat cushion adjuster can be obtained.

Still another aspect of the present disclosure is an adjustment method of a seat that comprises a cushion body part and a cushion adjustable part; the cushion body part comprises a first seating surface, and the cushion adjustable part comprises a second seating surface and is arranged in an arrangement direction pre-specified with respect to the cushion body part. This adjustment method comprises:

providing at least one bracket that comprises an inner wall configured to provide an inner hollow portion extending linearly;

providing at least one slider;

providing a plurality of interposing members, at least one of which comprising at least one supporting protrusion portion protruding toward the at least one bracket;

inserting the at least one slider into the inner hollow portion of the at least one bracket;

interposing the plurality of interposing members between the inner wall of the at least one bracket and the at least one slider such that the at least one slider is disposed among the plurality of interposing members and that the at least one supporting protrusion portion protrudes toward the at least one bracket;

arranging the at least one bracket such that an extending direction of the inner hollow portion coincides with the arrangement direction;

securing the at least one bracket to a first one of the cushion body part and the cushion adjustable part; and securing the at least one slider to a second one of the cushion body part and the cushion adjustable part, wherein the second one is different from the first one.

With this adjustment method, the same effects as those obtained by the above-described seat cushion adjuster can be obtained.

BRIEF DESCRIPTION OF THE DRAWINGS

Hereinafter, an example embodiment of the present disclosure will be described by way of example with reference to the accompanying drawings, in which.

DETAILED DESCRIPTION OF THE PREFERRED EMBODIMENTS

<1-1. Structure of a Seat>

Figure 1:
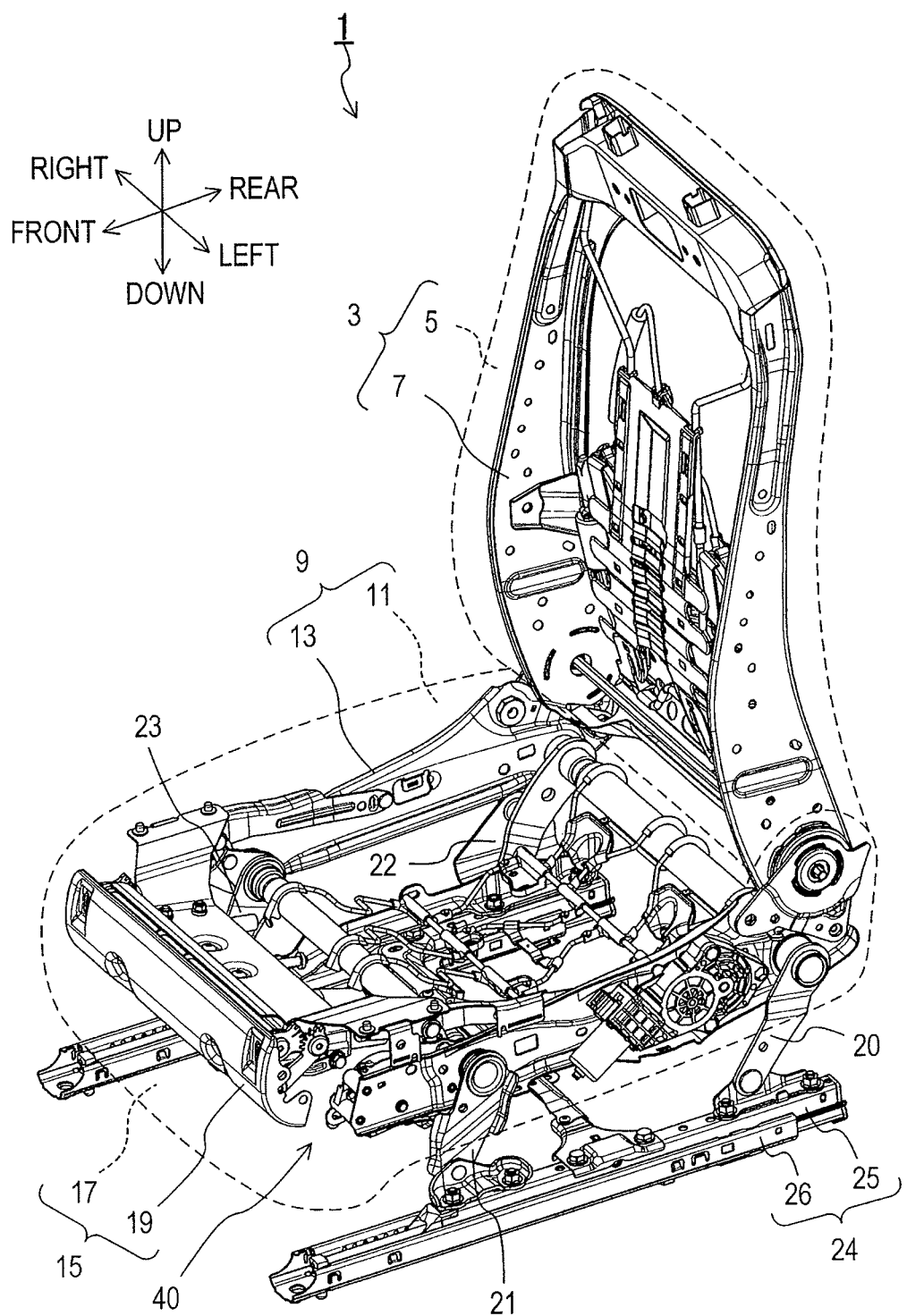
FIG. 1 is a perspective view showing a structure of a seat comprising a seat cushion adjuster.

FIG. 1 shows a seat 1 that is configured to be mounted in a moving object so that a person can be seated thereon. In the present embodiment, the seat 1 is assumed to be mounted in four-wheeled vehicles; however, a moving object in which the seat 1 is to be mounted is not limited to four-wheeled vehicles. Specifically, the seat 1 can be mounted in airplanes, trains, and ships. Also, the seat 1 is not limited to be mounted in a moving object and can be configured as a general chair.

Directions mentioned hereinafter correspond to directions viewed from a person seated on the seat 1. Specifically, "front" corresponds to a forward direction from the person seated on the seat 1; "rear" corresponds to a rearward direction from the person seated on the seat 1. "Left" corresponds to a leftward direction from the person seated on the seat 1; "right" corresponds to a rightward direction from the person seated on the seat 1. Moreover, "up" corresponds to an upward direction from the person seated on the seat 1, i.e., an upward direction along a height direction of the seat 1; "down" corresponds to a downward direction from the person seated on the seat 1, i.e., a downward direction along the height direction of the seat 1.

The seat 1 comprises a seatback 3, a cushion body part 9, a cushion adjustable part 15, lifter links 20, 21, 22, 23, and a seat cushion adjuster (hereinafter, simply referred to as "adjuster") 40.

The seatback 3 functions as a backrest for supporting an upper body of an occupant. The seatback 3 comprises a seatback pad 5 and a seatback frame 7.

The seatback pad 5 comprises a cushion for the seatback 3. The seatback frame 7 supports the seatback pad 5.

The cushion body part 9 functions as a main part of a seating surface for supporting the occupant's lower limbs, including the hip and legs. The cushion body part 9 comprises a body-part pad 11 and a seat cushion frame 13.

The body-part pad 11 is a cushion pad that corresponds to the main part of the seating surface. The seat cushion frame 13 supports the body-part pad 11.

The cushion adjustable part 15 functions as one part of the seating surface for supporting the occupant's lower limbs, and is disposed at a front end portion of the cushion body part 9.

The cushion adjustable part 15 comprises an adjustable-part pad 17 and an adjustable-part frame 19.

The adjustable-part pad 17 changes its position with respect to the cushion body part 9; when being extended, the adjustable-part pad 17 supports the occupant's lower limbs. The adjustable-part pad 17 is provided to extend forwardly and downwardly from a front end of the body-part pad 11. The adjustable-part pad 17 of the present embodiment is provided integrally with the body-part pad 11; however, the adjustable-part pad 17 can be provided separately from the body-part pad 11.

The adjustable-part frame 19 is a plate member that supports the adjustable-part pad 17. With a drive force transmitted from a drive mechanism 80, the adjustable-part frame 19 relatively changes a position of the adjustable-part pad 17 with respect to the body-part pad 11. Hereinafter, the adjustable-part frame 19 is also referred to as a drum 19.

Each of the lifter links 20, 21, 22, 23 is a bracket for mounting the seat 1 on a floor of a moving object and, in the present embodiment, has an elongated shape. Each of the lifter links 20, 21, 22, 23 has a first end and a second end; the first end is pivotally attached to the seat cushion frame 13, and the second end is pivotally attached to an upper rail 25 included in a slide rail 24.

The lifter links 20, 21, 22, 23 attached to the seat cushion frame 13 and the upper rail 25 as described above are swingable with respect to the upper rail 25. The swinging motion of the lifter links 20, 21, 22, 23 causes the seat cushion frame 13 to change its position in the height direction. This enables to change a height of the seat cushion frame 13 with respect to the upper rail 25 and therefore, the height of the seat 1 can be adjusted.

The upper rail 25 is included in the slide rail 24 and is slidably attached to a lower rail 26 to be fixed to the floor of the moving object.

<1-2. Adjuster>

The adjuster 40 relatively changes a position of the cushion adjustable part 15 with respect to the cushion body part 9.

Figure 2:
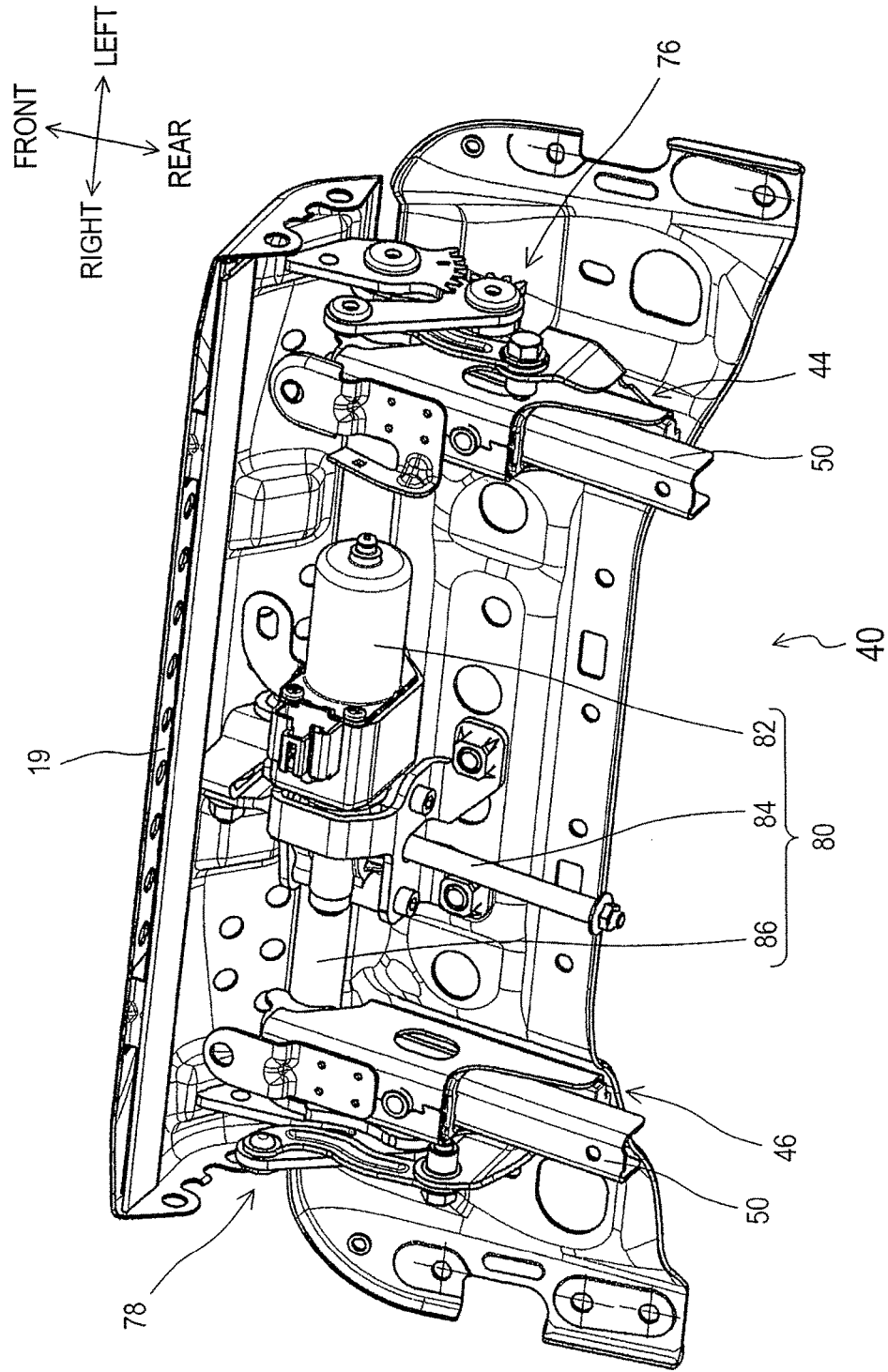
FIG. 2 is a perspective view of the seat cushion adjuster when viewed from below, in which a cushion adjustable part is in a non-extended state.
Figure 3:
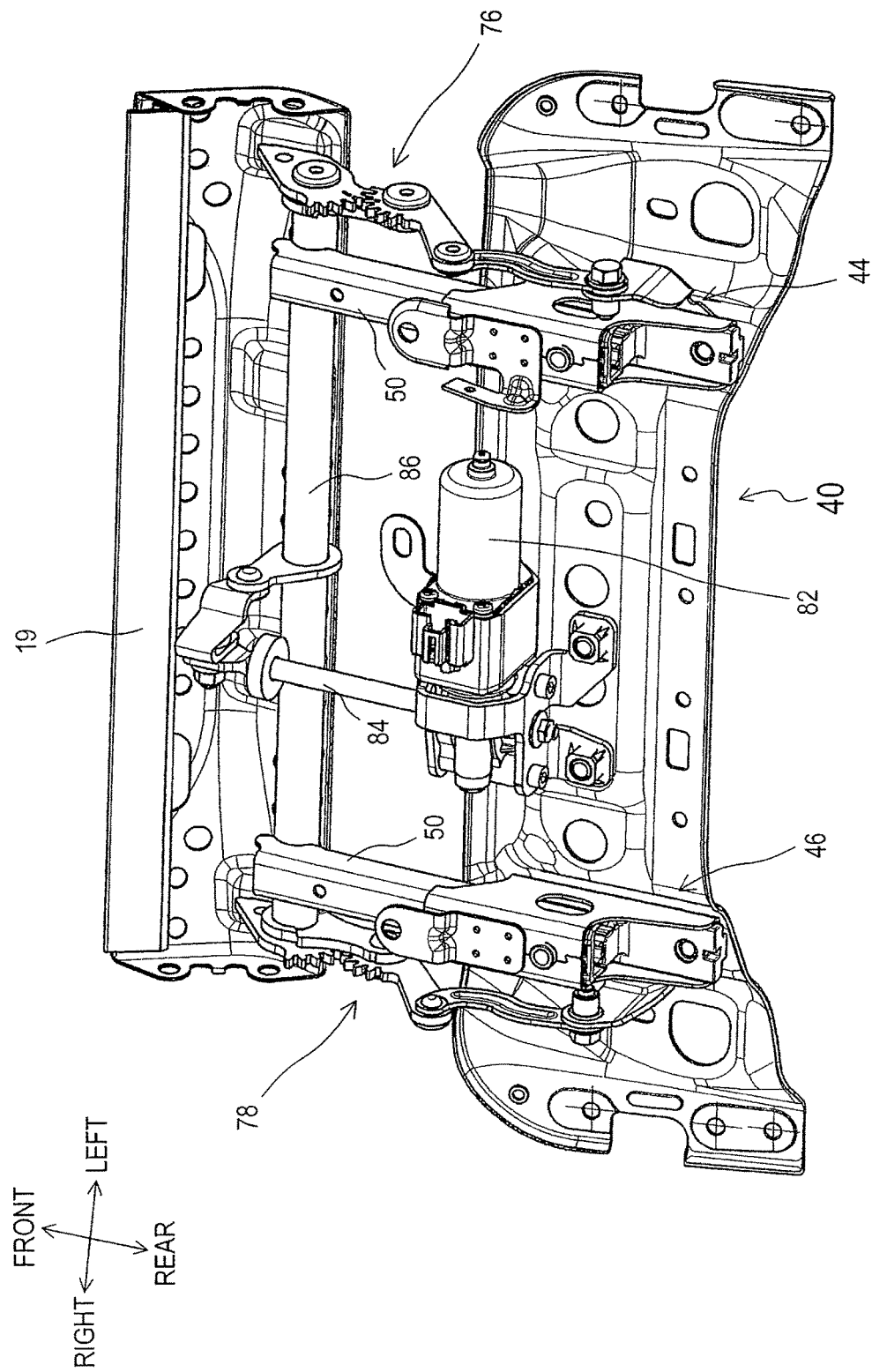
FIG. 3 is a perspective view of the seat cushion adjuster when viewed from below, in which the cushion adjustable part is in an extended state.

As shown in FIGS. 2 and 3, the adjuster 40 comprises adjustment mechanisms 44, 46, link mechanisms 76, 78, and the drive mechanism 80.

Each of the adjustment mechanisms 44, 46 comprises a slider 50 that slides in a front-rear direction of a vehicle with the drive force from the drive mechanism 80. When the cushion adjustable part 15 is extended, the adjustment mechanisms 44, 46 function as a seat frame that supports such an extended cushion adjustable part 15.

Each of the link mechanisms 76, 78 changes a position of the cushion adjustable part 15 with respect to the cushion body part 9. Each of the link mechanisms 76, 78 comprises a plurality of links. The plurality of links is coupled to one another so as to extend or contract in a front-rear direction of the seat 1 with the drive force from the drive mechanism 80. Specifically, in each of the link mechanisms 76, 78, among the plurality of links, one link of which located at its front end is fixed to the drum 19, and another link of which is coupled to the drive mechanism 80.

The drive mechanism 80 generates a drive force for driving the drum 19. The drive mechanism 80 comprises a motor 82, a shaft 84, and a pipe 86.

The motor 82 generates a drive force. The shaft 84 is a rod-like member. The shaft 84 is coupled to the motor 82 so as to move linearly in the front-rear direction with the drive force generated by the motor 82.

The pipe 86 is attached to the shaft 84 so as to move in the front-rear direction of the seat 1 with the drive force generated by the motor 82. Furthermore, the pipe 86 couples the slider 50 of the adjustment mechanism 44 to the aforementioned link located in the front end of the link mechanism 76; the pipe 86 couples the slider 50 of the adjustment mechanism 46 to the aforementioned link located in the front end of the link mechanism 78.

In the adjuster 40, the shaft 84 performs the linear movement toward the front with the drive force generated by the motor 82. This linear movement of the shaft 84 causes the pipe 86 to be pushed forward from the seat 1. In accordance with the forward movement of the pipe 86, the link mechanisms 76, 78 are extended to push the drum 19 upwardly.

As a result, the cushion adjustable part 15 provided externally to the drum 19 is extended, thereby increasing the seating surface of the seat 1.

When the shaft 84 performs the linear movement toward the rear with the drive force generated by the motor 82, the pipe 86 is retracted rearward in the seat 1. Consequently, in accordance with the rearward movement of the pipe 86, the link mechanisms 76, 78 become unextended to retract the drum 19 downwardly.

Consequently, the cushion adjustable part 15 is in an non-extended state, thereby reducing the seating surface of the seat 1.

<1-3. Adjustment Mechanism>

Detailed structures of the adjustment mechanisms 44, 46 will be described.

Figure 4:
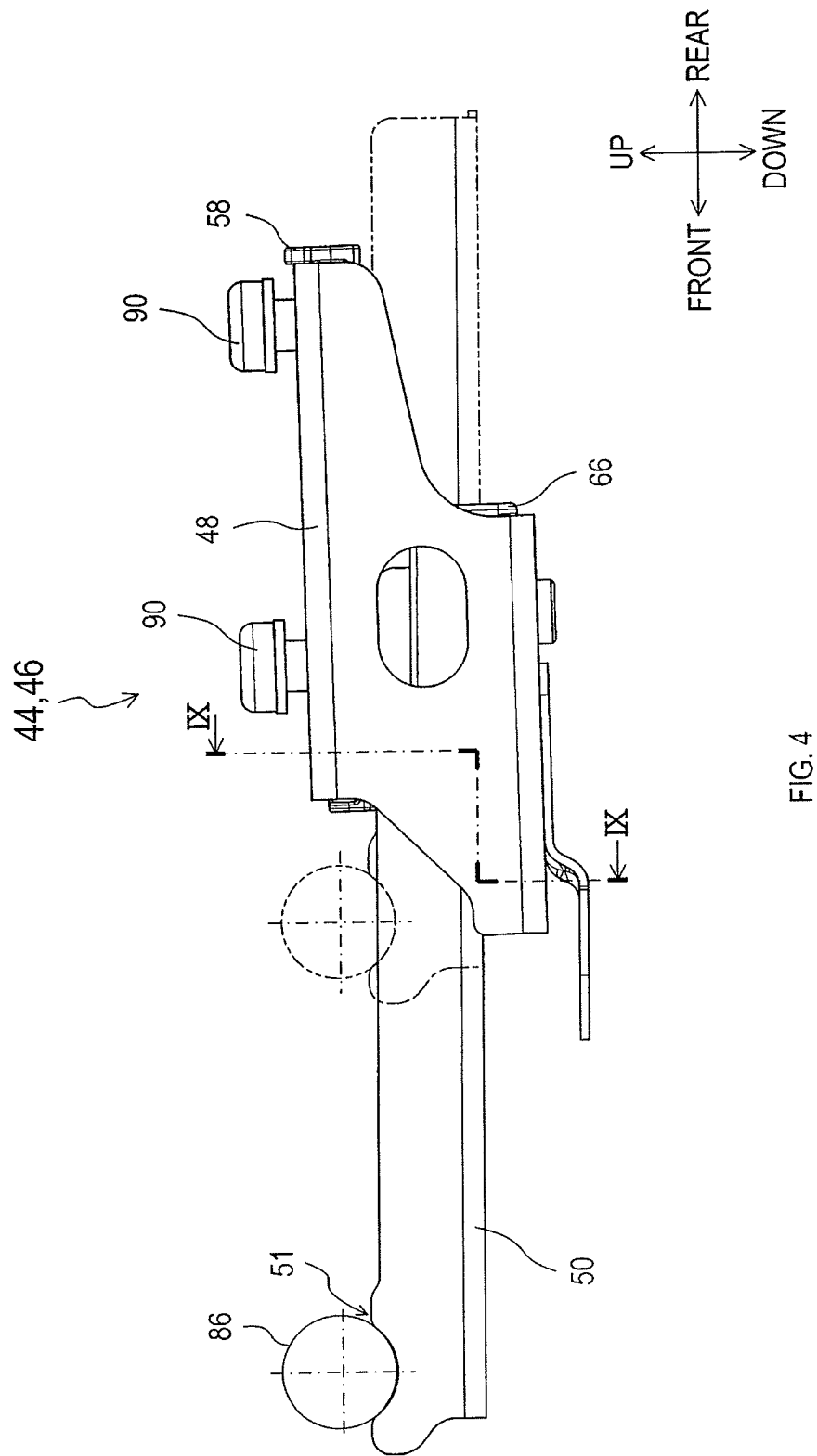
FIG. 4 is a front view of an adjustment mechanism in the seat cushion adjuster.
Figure 5:
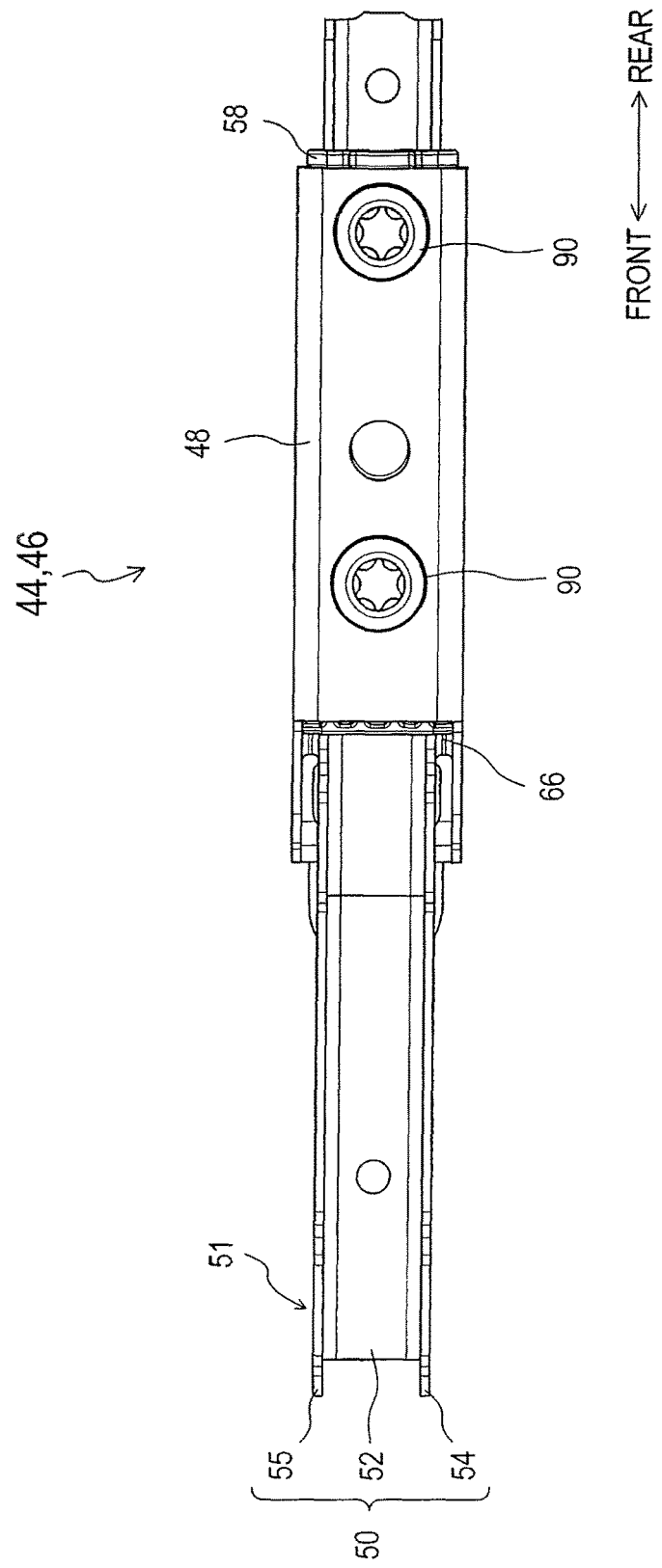
FIG. 5 is a top view of the adjustment mechanism in the seat cushion adjuster.

As shown in FIGS. 4 and 5, each of the adjustment mechanisms 44, 46 comprises a bracket 48, the slider 50, a first interposing member 58, and a second interposing member 66.

In FIG. 4, the broken line shows a position of the slider 50 and a position of the pipe 86 when the cushion adjustable part 15 is in the non-extended state, and the solid line shows a position of the slider 50 and a position of the pipe 86 when the cushion adjustable part 15 is in an extended state.

Figure 6:
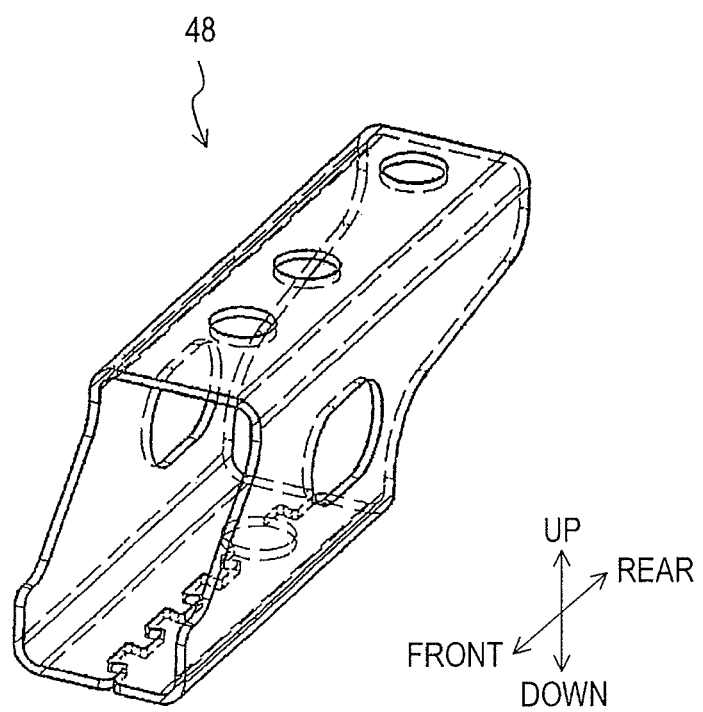
FIG. 6 is a perspective view of a bracket showing a schematic configuration thereof.

The bracket 48 is secured to the seat cushion frame 13. As shown in FIG. 6, the bracket 48 has a closed-ring-shaped cross section orthogonal to the front-rear direction of the seat 1; that is to say, the bracket 48 has a tubular contour in which an inner hollow portion extends linearly in the front-rear direction. Both ends of the bracket 48 in the front-rear direction are open. The bracket 48 may be formed by bending a plate member and joining its lower surfaces together. In this case, the joined portions in the lower surfaces of the bracket 48 may have mutually-engaging concaves and convexes. The bracket 48 may be made of, for example, a metal material (iron and steel material).

The slider 50 is inserted into the inner hollow portion of the bracket 48. In one end of the slider 50, a recess part 51 to be engaged with the pipe 86 is provided. The pipe 86 is disposed to bridge between the recess part 51 in the slider 50 of the adjustment mechanism 44 and the recess part 51 in the slider 50 of the adjustment mechanism 46. The pipe 86 disposed to bridge between these recess parts 51 of the sliders 50 is secured to these sliders 50.

Because the pipe 86 is coupled to the drum 19 via the link mechanisms 76, 78, the one end of the slider 50 is indirectly secured to the cushion adjustable part 15.

It is to be noted that the securing of the pipe 86 to the slider 50 may be achieved by welding or by other methods.

Moreover, as shown in FIG. 5, the slider 50 comprises a base plate part 52 and a pair of raised parts 54, 55. The base plate part 52 is a rectangular plate-like portion. The raised parts 54, 55 are rectangular plate-like portions provided on both ends of the base plate part 52 along a longitudinal direction of the base plate part 52, so as to be raised with respect to the surface of the base plate part 52 (in the present embodiment, an upper surface of the base plate part 52). In the present embodiment, the pair of raised parts 54, 55 is raised in the same direction, i.e., parallel to each other; however, the pair of raised parts 54, 55 may be raised in directions crossing each other.

The slider 50 configured as described above comprises a concave space (region) defined by the base plate part 52 and the pair of raised parts 54, 55, and has a generally U-shaped cross section in a direction orthogonal to the front-rear direction. The term "concave" as used herein means a recess extending in the front-rear direction.

The slider 50 is inserted into the bracket 48 along a longitudinal direction of the slider 50.

It is to be noted that the slider 50 may be, for example, made of a metal material (e.g., iron and steel material).

Figure 7:
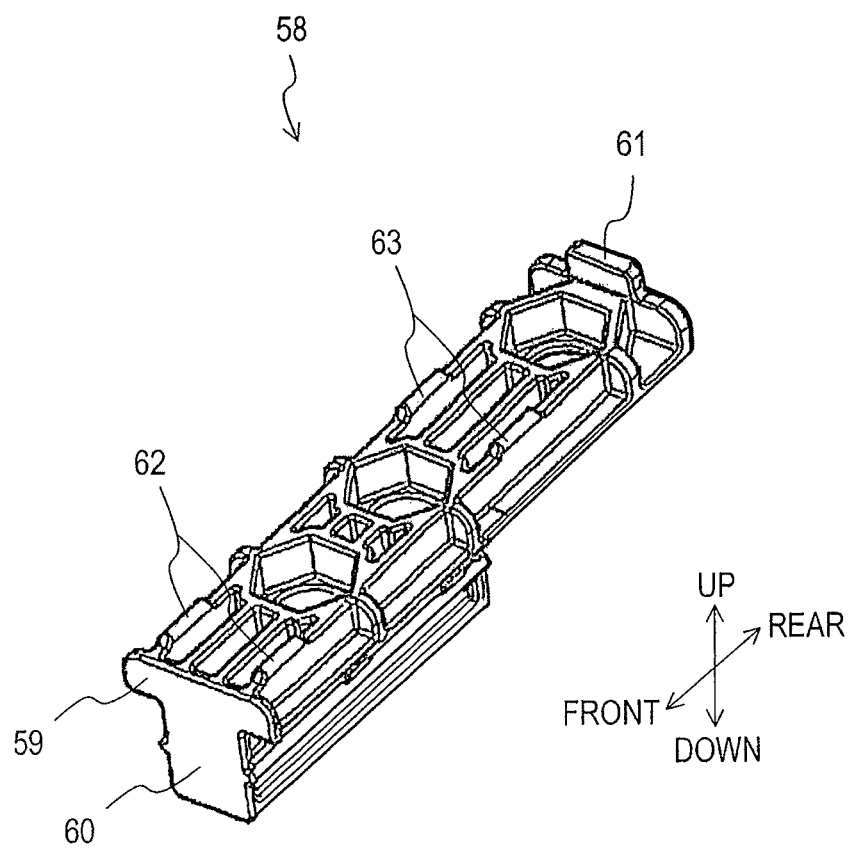
FIG. 7 is a perspective view of a first interposing member showing a schematic configuration thereof.

The first interposing member 58 is disposed between an inner wall of the bracket 48 and the slider 50. As shown in FIG. 7, the first interposing member 58 comprises a base part 59 and a convex 60.

The base part 59 is a rectangular plate-like portion and is disposed between an upper portion of the inner wall of the bracket 48 and the slider 50.

The base part 59 comprises a stopper 61 and supporting protrusion portions 62, 63.

The stopper 61 is a protrusion provided on a rear end of the first interposing member 58 in the front-rear direction of the seat 1. The stopper 61 facilitates positioning of the first interposing member 58 with respect to the bracket 48.

Each of the supporting protrusion portions 62, 63 comprises a pair of projections projecting upwardly from a top side of the base part 59. The pair of projections is disposed to face each other in a cross-sectional direction of the base part 59. In addition, the pair of projections extends along a longitudinal direction of the base part 59.

The supporting protrusion portions 62, 63 are disposed spaced apart from each other along the front-rear direction. In this embodiment, as merely one example, the supporting protrusion portion 62 is disposed on the top side of the base part 59 at a position facing to a front-end-side upper portion of the inner wall of the bracket 48; the supporting protrusion portion 63 is disposed on the top side of the base part 59 at a position facing to a rear-end-side upper portion of the inner wall of the bracket 48. The supporting protrusion portions 62, 63 may be disposed at different positions from those in this example.

The convex 60 is a portion protruding downwardly from the base part 59 and is disposed in the aforementioned concave region of the slider 50. The convex 60 comprises a plurality of sliding projections 64 (see FIG. 9). The sliding projections 64 protrude downwardly from an underside of the convex 60.

The first interposing member 58 may be made of, for example, resin material. The base part 59 and the convex 60 of the first interposing member 58 are formed in a ribbed shape so as to have a hollow structure. However, structures of the base part 59 and the convex 60 of the first interposing member 58 are not limited to the aforementioned structure; the base part 59 and the convex 60 of the first interposing member 58 may be formed as a solid structure.

The first interposing member 58 may be secured to the bracket 48 via fastening members 90, for example.

Figure 8:
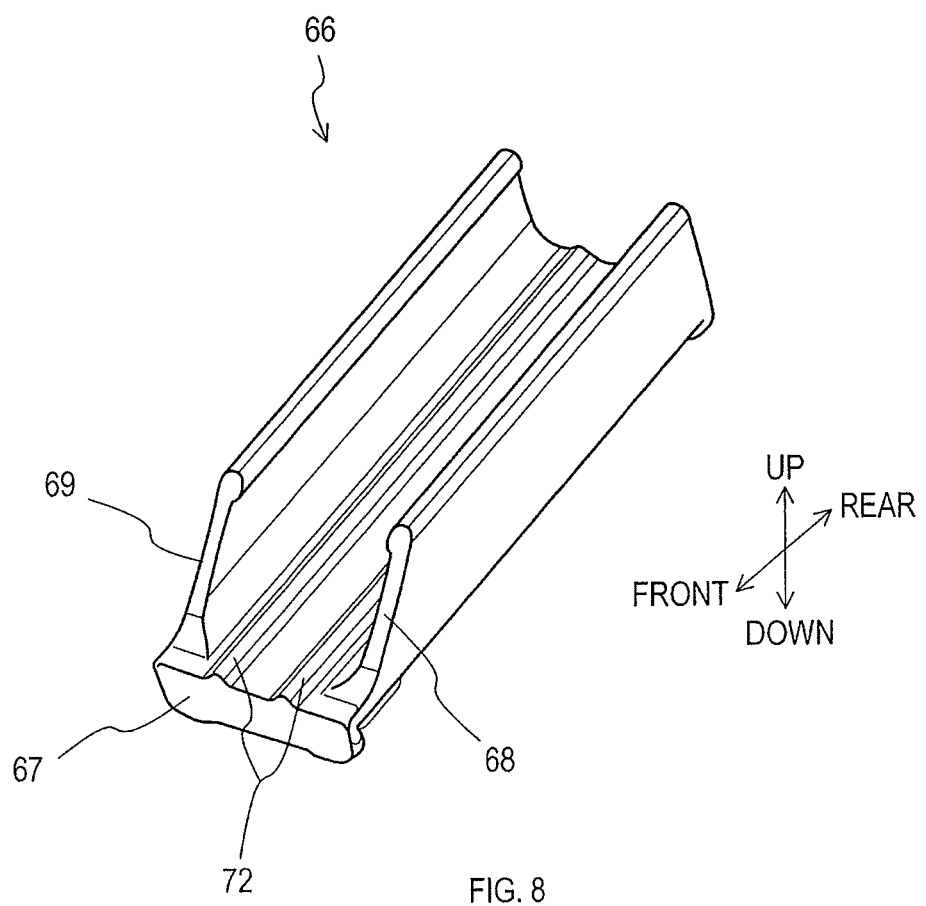
FIG. 8 is a perspective view of a second interposing member showing a schematic configuration thereof.

The second interposing member 66 is disposed between the inner wall of the bracket 48 and the slider 50. As shown in FIG. 8, the second interposing member 66 comprises a base part 67 and a pair of side walls 68, 69.

The base part 67 is a plate-like portion and is disposed between a bottom portion of the inner wall of the bracket 48 and an underside of the base plate part 52 of the slider 50. The base part 67 has a shape of a rectangle having short sides longer than short sides of the base plate part 52 of the slider 50. The side walls 68, 69 are rectangular plate-like portions provided on both ends of the base part 67 along a longitudinal direction of the base part 67, so as to be raised with respect to the surface of the base part 67 (in the present embodiment, an upper surface of the base part 67). The side wall 68 is disposed between an inner-left side of the inner wall of the bracket 48 and an outer side of the raised part 54 of the slider 50. The side wall 69 is disposed between an inner-right side of the inner wall of the bracket 48 and an outer side of the raised part 55 of the slider 50.

That is to say, the second interposing member 66 has a concave outer profile to accommodate the slider 50 therein.

Moreover, the base part 67 comprises supporting protrusions 70, 71 (see FIG. 9) and a plurality of sliding projections 72.

Each of the supporting protrusion portions 70, 71 comprises a pair of projections projecting downwardly from an underside of the base part 67. The pair of projections is disposed to face each other along a cross-sectional direction of the base part 67. In addition, the pair of projections extends in a longitudinal direction of the base part 67.

The supporting protrusion portions 70, 71 are disposed spaced apart from each other along the front-rear direction. In this embodiment, as merely one example, the supporting protrusion portion 70 is disposed in the underside of the base part 67 at a position facing to a rear-end-side bottom portion of the inner wall of the bracket 48; the supporting protrusion portion 71 is disposed in the underside of the base part 67 at a position facing to a front-end-side bottom portion of the inner wall of the bracket 48. The supporting protrusion portions 70, 71 may be disposed at different positions from those in this example.

The sliding projection 72 is a protrusion protruding upwardly from the upper surface of the base part 67. The term "protrusion" as used herein means a protrusion extending in the front-rear direction.

The second interposing member 66 may be made of, for example, resin material.

Next, operations of the adjustment mechanisms 44, 46 will be described.

Figure 9:
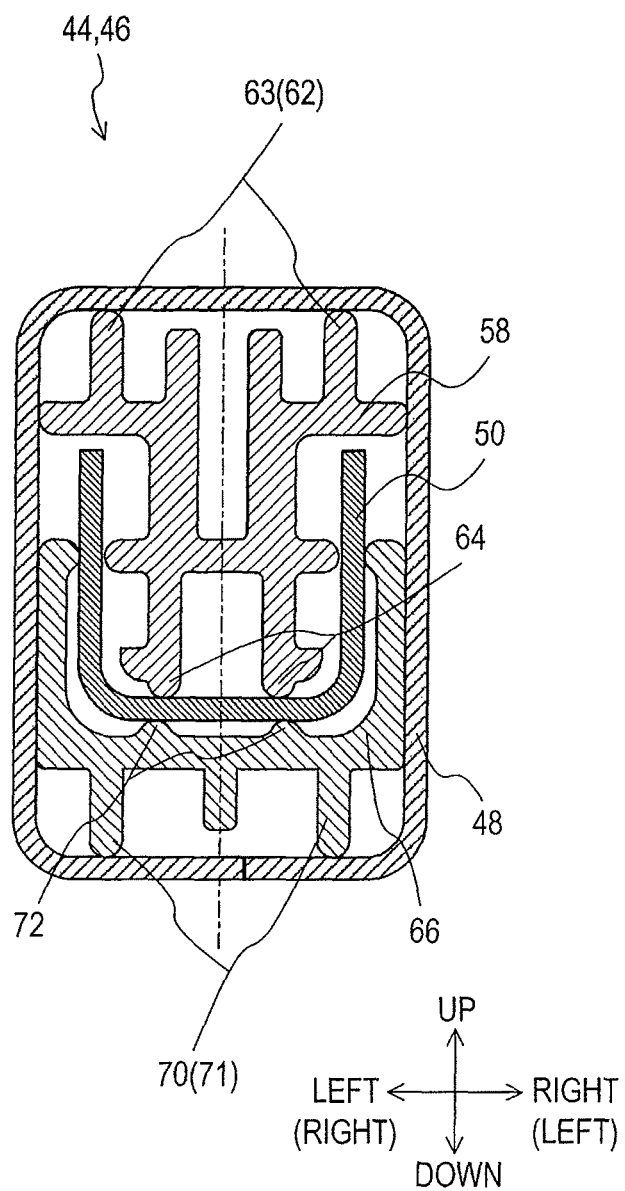
FIG. 9 is a sectional view taken along the line IX-IX in FIG. 4.

In the adjustment mechanisms 44, 46, as shown in FIG. 9, the slider 50 disposed between the first interposing member 58 and the second interposing member 66 is inserted in an inner space or the inner hollow portion of the bracket 48.

In the adjustment mechanisms 44, 46, the supporting protrusion portions 62, 63 of the first interposing member 58 are in contact with the upper portion of the inner wall of the bracket 48; the supporting protrusion portions 70, 71 of the second interposing member 66 are in contact with the bottom portion of the inner wall of the bracket 48. Moreover, the supporting protrusion portion 62 of the first interposing member 58, the supporting protrusion portion 71 of the second interposing member 66, the supporting protrusion portion 63 of the first interposing member 58, and the supporting protrusion portion 70 of the second interposing member 66 are arranged alternately (i.e., in zig-zag fashion) along the front-rear direction, so as not to overlap one another in the up-down direction in a cross section taken orthogonal to the front-rear direction. Specifically, these protrusion portions are arranged in the following order from front to rear in the front-rear direction: the supporting protrusion portion 71, the supporting protrusion portion 62, the supporting protrusion portion 70, and the supporting protrusion portion 63.

Each of the supporting protrusion portion 71, the supporting protrusion portion 62, the supporting protrusion portion 70, and the supporting protrusion portion 63 may comprise, instead of the pair of projections, one projection, or three or more projections.

In the adjustment mechanisms 44, 46, the base part 59 of the first interposing member 58 is disposed between the inner wall of the bracket 48 and the slider 50. The convex 60 of the first interposing member 58 is disposed in the concave region defined by the base plate part 52 of the slider 50 and the pair of raised parts 54, 55.

Moreover, the sliding projections 64 protruding downwardly from a lower end of the convex 60 are in contact with the upper surface of the base plate part 52 of the slider 50.

Furthermore, in the adjustment mechanisms 44, 46, the base part 67 of the second interposing member 66 is disposed between the inner wall of the bracket 48 and the underside of the base plate part 52 of the slider 50. Also, the side wall 68 of the second interposing member 66 is disposed between the inner wall of the bracket 48 and the raised part 54 of the slider 50, and the side wall 69 of the second interposing member 66 is disposed between the inner wall of the bracket 48 and the raised part 55 of the slider 50. That is, the slider 50 is accommodated in the concave space defined by the base part 67 of the second interposing member 66 and the side walls 68, 69.

The sliding projections 72 protruding upwardly from the upper surface of the base part 67 are in contact with the underside of the base plate part 52 of the slider 50.

In the adjustment mechanisms 44, 46 configured as described above, when the pipe 86 is moved forwardly with the drive force generated in the drive mechanism 80, the slider 50 secured to this pipe 86 is made to move forwardly from a retracted position inside the bracket 48. The term "retracted position" as used herein means a position at which the slider 50 in the non-extended state is present.

In accordance with the aforementioned forward movement of the slider 50, the link mechanisms 76, 78 are extended to push the drum 19 upwardly. Consequently, the cushion adjustable part 15 externally attached to the drum 19 is extended, thereby increasing the seating surface of the seat 1. The sliders 50 of the adjustment mechanisms 44, 46 function as frames for supporting the cushion adjustable part 15.

Meanwhile, in the adjustment mechanisms 44, 46, when the pipe 86 is moved rearwardly with the drive force generated in the drive mechanism 80, the slider 50 secured to this pipe 86 is moved rearwardly from an extended position inside the bracket 48. The term "extended position" as used herein means a position at which the slider 50 in the extended state is present.

In accordance with the aforementioned rearward movement of the slider 50, the link mechanisms 76, 78 are made to be in the non-extended state so as to retract the drum 19 downwardly. Consequently, the cushion adjustable part 15 is in the non-extended state, thereby reducing the seating surface of the seat 1.

[Effects of the Embodiment]

As has been described above, because the slider 50 in the adjuster 40 is inserted in the bracket 48 in a state where the slider 50 is disposed between the first interposing member 58 and the second interposing member 66, rigidity for supporting the cushion adjustable part 15 can be ensured.

In the adjuster 40, when the slider 50 is slid with the drive force generated by the motor 82, this sliding of the slider 50 causes a load acting in the up-down direction to be applied to the first interposing member 58 and the second interposing member 66. As a result, the first interposing member 58 is allowed to bend corresponding to the height of the supporting protrusion portions 62, 63; the second interposing member 66 is allowed to bend corresponding to the height of the supporting protrusion portions 70, 71.

When the first interposing member 58 and the second interposing member 66 are bent in the above-described manner, it is possible to reduce the contact area between the first interposing member 58 and the slider 50 and the contact area between the second interposing member 66 and the slider 50. Consequently, it is possible to reduce a contact load to be applied to the slider 50 from the first interposing member 58 and a contact load to be applied to the slider 50 from the second interposing member 66, thereby reducing a load necessary for driving the slider 50.

In other words, with the adjuster 40, it is possible to provide a technique for reducing a load necessary for driving the slider 50, while ensuring rigidity for supporting the cushion adjustable part 15.

Moreover, the supporting protrusion portions 62, 63, 70, 71 are arranged alternately at respective positions spaced apart from one another along the insertion direction of the slider 50, so as not to overlap one another in the up-down direction. Accordingly, when a load generated by sliding of the slider 50 is applied to the first interposing member 58 and the second interposing member 66, each of the first interposing member 58 and the second interposing member 66 is allowed to bend sufficiently in the adjuster 40.

In addition, in the aforementioned embodiment, the slider 50 is supported by the supporting protrusion portions 62, 63, 70, 71. For this reason, the slider 50 can be firmly supported inside bracket 48 in the adjuster 40.

Furthermore, in the above-described embodiment, the slider 50 has a U-shaped cross section formed by the base plate part 52 and the pair of raised parts 54, 55.

With this configuration, the adjuster 40 can ensure rigidity along the height direction of the seat 1. Also, with the adjuster 40, it is possible to reduce a length of the slider 50 in the width direction (i.e., inward-outward direction) and therefore, reduce a size of the adjuster 40 in the width direction.

That is, with the adjuster 40, it is possible to downsize the adjuster 40, while ensuring the rigidity.

[Other Embodiments]

The embodiment of the present disclosure has been described. However, the present disclosure should not be limited to the above-described embodiment and can be practiced in various modes without departing from the spirit of the present disclosure.

For example, each of the adjustment mechanisms 44, 46 in the above-described embodiment comprises one first interposing member 58 and one second interposing member 66. However, the number of the interposing members is not limited to the aforementioned number, and additional interposing members may be provided. In such a case, for example, the first interposing member 58 may include two members.

In addition, in the above-described embodiment, the first interposing member 58 and the second interposing member 66 are arranged to interpose the slider 50 therebetween in the up-down direction. However, the interposition of the slider 50 between the first interposing member 58 and the second interposing member 66 is not limited to this configuration. That is, the first interposing member 58 and the second interposing member 66 may interpose the slider 50 in any manner as long as the following conditions are satisfied: the first interposing member 58 and the second interposing member 66 are located between the slider 50 and the inner wall of the bracket 48; the convex 60 of the first interposing member 58 is disposed in the concave region formed by the base plate part 52 and the pair of raised parts 54, 55 of the slider 50; and the second interposing member 66 is formed in a concave shape to accommodate the slider 50 therein and is disposed to face an opposite surface of the slider 50, which is opposite to the surface of the slider 50 where the first interposing member 58 is disposed. For example, the slider 50 may be disposed between the first interposing member 58 and the second interposing member 66 in the left-right direction.

Furthermore, in the above-described embodiment, the bracket 48 is secure to the cushion body part 9 and the one end of the slider 50 is secured to the cushion adjustable part 15; however, the securing of the bracket 48 and the securing of the slider 50 are not limited to the aforementioned parts. For example, it may be configured such that the one end of the slider 50 is secured to the cushion body part 9 and that the bracket 48 is secured to the cushion adjustable part 15. In other words, the adjustment mechanisms 44, 46 may comprise any structure that enables increase of the seating surface of the seat 1 by extending the cushion adjustable part 15 due to sliding of the slider 50.

Moreover, in the aforementioned embodiment, the slider 50 has a U-shaped cross section; however, the cross-sectional shape of the slider 50 is not limited to the aforementioned shape and may be, for example, tubular or columnar.

Moreover, in the above-described embodiment, the seat 1 is mounted in a vehicle by means of the lifter links 20, 21, 22, 23. However, the parts used for mounting the seat 1 in a vehicle is not limited to the aforementioned links. For example, brackets may be used to mount the seat 1 in a vehicle.

It is to be noted that a mode in which part of the configuration in the above-described embodiment is omitted is included in the embodiment of the present disclosure. Also, a mode made by appropriately combining the aforementioned embodiment with modified examples is included in the embodiment of the present disclosure. In addition, any modes that can be conceived without departing from the spirit of the invention defined in the following claims are included in the embodiment of the present disclosure.

What is claimed is:

1. A seat cushion adjuster comprising:
   at least one bracket configured to be secured to a first one of a cushion body part and a cushion adjustable part, the cushion body part comprising a first seating surface, the cushion adjustable part comprising a second seating surface and being arranged in an arrangement direction pre-specified with respect to the cushion body part and being capable of changing a position thereof with respect to the cushion body part, and the at least one bracket comprising an inner wall configured to provide an inner hollow portion extending in the arrangement direction;
   at least one slider configured to be secured to a second one of the cushion body part and the cushion adjustable part, the second one being different from the first one, the at least one slider being inserted into the inner hollow portion of the at least one bracket; and
   a plurality of interposing members that is separate from the at least one bracket and the at least one slider and that is positioned between the inner wall of the at least one bracket and the at least one slider so as to interpose the at least one slider among the plurality of interposing members in the inner hollow portion of the at least one bracket, wherein at least one interposing member of the plurality of interposing members comprises at least one supporting protrusion portion protruding toward the at least one bracket.

2. The seat cushion adjuster according to claim 1,
   wherein the at least one supporting protrusion portion comprises a plurality of supporting protrusion portions spaced apart from one another along an insertion direction of the at least one slider into the inner hollow portion.

3. The seat cushion adjuster according to claim 2,
   wherein the plurality of interposing members comprise a first interposing member and a second interposing member, the second interposing member being disposed to face the first interposing member with the at least one slider disposed therebetween,
   wherein the at least one supporting protrusion portion comprises:
      at least two first supporting protrusion portions provided in a first member of the first interposing member and the second interposing member; and
      at least one second supporting protrusion portion provided in a second member of the first interposing member and the second interposing member, the second member being different from the first member, and
   wherein the at least one second supporting protrusion portion is disposed between the at least two first supporting protrusion portions in the insertion direction.

4. The seat cushion adjuster according to claim 3,
   wherein the at least one slider comprises:
      a base plate part of a plate shape comprising a pair of ends that extends in the arrangement direction and that faces each other; and
      a pair of raised parts raised from the pair of ends of the base plate part so as to be raised with respect to one surface of the base plate part,
   wherein the base plate part and the pair of raised parts provide a concave portion,
   wherein the first interposing member comprises a convex disposed inside the concave portion, and
   wherein the second interposing member comprises a concave accommodating the at least one slider therein and is disposed to face the first interposing member with the at least one slider disposed between the first interposing member and the second interposing member.

5. The seat cushion adjuster according to claim 1,
   wherein at least one interposing member of the plurality of interposing members comprises at least one sliding projection protruding toward the at least one slider.

6. The seat cushion adjuster according to claim 1, wherein the at least one bracket has a tubular shape.

7. The seat cushion adjuster according to claim 1, wherein the at least one bracket comprises a plurality of brackets, and
wherein the at least one slider comprises a plurality of sliders.

8. A seat comprising:
a cushion body part comprising a first seating surface;
a cushion adjustable part comprising a second seating surface and arranged in an arrangement direction pre-specified with respect to the cushion body part and configured to change a position of the cushion adjustable part with respect to the cushion body part;
at least one bracket secured to a first one of the cushion body part and the cushion adjustable part, the at least one bracket comprising an inner wall configured to provide an inner hollow portion extending in the arrangement direction;
at least one slider secured to a second one of the cushion body part and the cushion adjustable part, the second one being different from the first one, the at least one slider being inserted into the inner hollow portion of the at least one bracket; and
a plurality of interposing members that is separate from the at least one bracket and the at least one slider and that is positioned between the inner wall of the at least one bracket and the at least one slider so as to interpose the at least one slider among the plurality of interposing members in the inner hollow portion of the at least one bracket, wherein at least one interposing member of the plurality of interposing members comprises at least one supporting protrusion portion protruding toward the at least one bracket.

9. The seat cushion adjuster according to claim 8, wherein the at least one bracket has a closed-ring-shaped cross section.

10. The seat cushion adjuster according to claim 9, wherein a lower portion of the at least one bracket extends forwards further than an upper portion of the at least one bracket, and
wherein the upper portion of the at least one bracket extends rearwards further than the lower portion of the at least one bracket.

11. An adjustment method of a seat that comprises a cushion body part and a cushion adjustable part, the cushion body part comprising a first seating surface, the cushion adjustable part comprising a second seating surface and being arranged in an arrangement direction pre-specified with respect to the cushion body part, the adjustment method comprising:
providing at least one bracket that comprises an inner wall configured to provide an inner hollow portion extending linearly;
providing at least one slider;
providing a plurality of interposing members, at least one of which comprising at least one supporting protrusion portion protruding toward the at least one bracket,
inserting the at least one slider into the inner hollow portion of the at least one bracket;
positioning the plurality of interposing members that is separate from the at least one bracket and the at least one slider between the inner wall of the at least one bracket and the at least one slider such that the at least one slider is disposed among the plurality of interposing members and that the at least one supporting protrusion portion protrudes toward the at least one bracket;
arranging the at least one bracket such that an extending direction of the inner hollow portion coincides with the arrangement direction;
securing the at least one bracket to a first one of the cushion body part and the cushion adjustable part; and
securing the at least one slider to a second one of the cushion body part and the cushion adjustable part, the second one being different from the first one.

12. The seat cushion adjuster according to claim 1, wherein the at least one bracket has a closed-ring-shaped cross section.

13. The seat cushion adjuster according to claim 12, wherein a lower portion of the at least one bracket extends forwards further than an upper portion of the at least one bracket, and
wherein the upper portion of the at least one bracket extends rearwards further than the lower portion of the at least one bracket.

* * * * *